United States Patent [19]

Takemoto et al.

[11] 4,021,005
[45] May 3, 1977

[54] FRONT LOADING CASSETTE TAPE MACHINE

[76] Inventors: Shigeji Takemoto, 8-7 Asahi-cho, Gakuen, Nara; Kazuhisa Nishitani, 7-627 Nakagaideo, Osaka, Daito, both of Japan

[22] Filed: May 13, 1975

[21] Appl. No.: 577,001

[30] Foreign Application Priority Data

July 13, 1974 Japan ............................... 49-80505
Sept. 3, 1974 Japan ............................ 49-101707

[52] U.S. Cl. .............................. 242/198; 360/105
[51] Int. Cl.[2] ................... G03B 1/04; G11B 15/32; G11B 23/04
[58] Field of Search .................... 242/198–200; 360/96, 85, 105

[56] References Cited

UNITED STATES PATENTS

| 3,578,261 | 5/1971 | Yamamoto et al. | 242/199 |
| 3,675,876 | 7/1972 | Frederick | 242/198 |
| 3,936,877 | 2/1976 | Maruyama et al. | 360/96 |

*Primary Examiner*—Leonard D. Christian
*Attorney, Agent, or Firm*—George H. Mitchell, Jr.

[57] ABSTRACT

The present invention relates to a tape recorder for a cassette having a magnetic tape.

The tape recorder comprises a case for accommodating a cassette wherein are located a magnetic tape and reels for winding said magnetic tape, a winding reel shaft for supporting the winding reel, a capstan shaft for forwarding the magnetic tape at constant speed, an injecting lever for engaging and releasing the winding reel shaft and the capstan shaft to and from the case, and a lock plate for keeping said winding reel shaft and the capstan shaft off the case and, linked with the cassette, transferring the winding reel shaft and the capstan shaft so that the shafts may approach the case.

18 Claims, 14 Drawing Figures

FRONT LOADING CASSETTE TAPE MACHINE

The present invention relates to a tape recorder which accomodates a cassette containing a pair of reels and a magnetic tape being wound between said reels, and which manipulates the performance operation and rapid-forwarding operation of said tape.

The first object of the present invention is to provide a tape recorder wherein the structure is very compact, the setting and removal of a cassette is easily conducted, and the operations of performance and fast-forwarding of said tape are simple manipulated, so that the tape recorder may be fit especially in a car and is handy to carry.

Other objects and advantages of the present invention will appear from the following detailed description of certain preferred embodiments of the invention.

Figure 3:
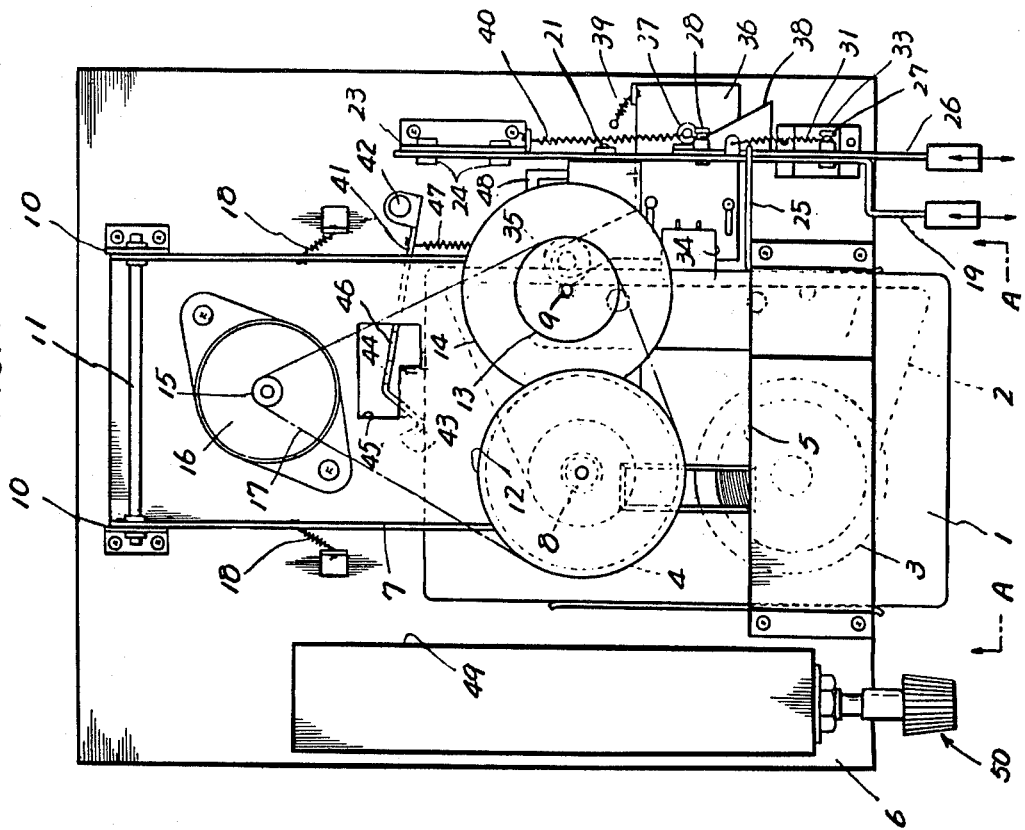
FIG. 3 is a plan view illustrating the condition of a cassette's placement in the tape recorder.

Referring to FIGS. 1 to 6, designated 1 is a cassette containing a magnetic tape 2 definite in length and a pair of reels 3, 4 for winding said tape 2. Designated 5 is an accommodating case, set on a tape recorder's chassis 6, which locates and retains the aforementioned cassette 1; the cross-sectional form of said cassette 1 and the opening form of said case 5 are made almost similar so that the cassette 1 may be slidably inserted in said case 5. Designated 7 is a movable plate; on one end portion of said movable plate 7 are pivotally fixed a winding reel shaft 8 which can be inserted in and contacted with a winding reel 4 of said cassette 1 and a capstan shaft 9 for forwarding a magnetic tape 2 at a uniform speed; the other end portion of said plate 7 is pivoted on the chassis 6 and is able to move upward and downward through bearing plates 10, 10 and a supporting shaft 11; a slip pulley 12 is formed on the same shaft of said winding reel shaft 8; on the same shaft of said capstan shaft 9 is formed a flywheel 14 which unites with it a linking pulley 13 and also at the center of the movable plate 7 is attached a driving motor 16 which possesses an output pulley 15 on the same level as each of said pulleys 12, 13. Moreover, corresponding to said reel shaft's 8 rotation number for winding a tape (i.e., fast-forwarding) and to the capstan shaft's 9 rotation number for transmitting a tape (i.e. playing back), the diameter of each of said pulleys 12, 13 as well as that of the output pulley 15 of said motor 16 is formed; each of said pulleys 12, 13, 15 are cooperatively linked through the same endless belt 17; so that said motor's 16 output may be simultaneously supplied to the winding reel shaft 8 and the capstan shaft 9, which are pivotally fixed on the movable plate 7, may be pulled toward the accommodating case 5.

Designated 19 is an injecting lever which is linked and moved with said movable plate 7 in order to move backward the movable plate 7 against the springs 18, 18. A sloping slot, which is angled backward and forward so as to raise the forward portion higher, is formed in the middle of said lever 19; a roller 21, which is inserted in and contacted with the inside of said slot 20, is pivotally fixed on the free side of the movable plate 7. Furthermore, a level slot 22 is formed by extending the bottom end of said sloping slot 20 toward the rear part of the injecting lever 19; pins 24, 24 inserted with the heads projected in the side of a locating plate 23, which is fixed with the chassis 6, are slidably inserted in said slot 22; the front part of said lever 19 is slidably inserted in a guide plate 25 which is perpendicularly installed on the chassis 6; thereby rolling motion of the movable plate 7 and sliding motion of the injecting lever 19 can be made to be cooperated.

Designated 26 is a fast-forwarding lever slidably attached to said injecting lever's 19 side. Pins 27, 28 installed with their heads projected on said lever 19 are slidably inserted in a slot 29 which is formed in the longitudinal direction of the lever 26. A lock portion 29a, i.e., one stopping element which is contacted and hooked with the pin 27, i.e., the other stopping element, is formed by extending upward the front portion of the slot 29; and at the same time said lever 26 is moved and kept forward by stretching a press spring 31 between the pin 27 and the rear portion of the fast-forwarding lever 26. Also a tongue 32, forming one releasing element, is projectably formed on the lower portion of said lever 26 while the other releasing element is formed by a raised sloping plane 33, i.e., the other releasing element, which rotates the lever 26 upward with a swinging movement through the contact with said tongue 32 and on the pin 28 as a fulcrum; the fast-forwarding lever 26 is kept in an operating condition through the linkage between the pin 27, i.e., one stopping element and the lock portion 29a, and said linkage is released through the contact between the tongue 32, and the raised sloping plane 33, and the lever 26 is moved backward by means of the spring 31. Moreover, on the chassis 6 and in the condition of facing the accommodating case 5 is slidably formed a mounting plate 36 which carries a magnetic head 34 to be contacted with a magnetic tape 2 of the cassette 1 placed in the accommodating case 5 and also carries a pinch roll 35 to be pressed and contacted through the magnetic tape 2 with the capstan shaft 9 which is inserted in the cassette 1; on the plate 36 is pivotally fixed a guide roll 37 and also on the side of said fast-forwarding lever 26 is formed a sloping guide 38 with the front portion of the lever 26 projected; a spring 39 is fixed with the plate 36 so that said roll 37 may be pressed and contacted with this guide 38; thereby said mounting plate 36 is to approach to and return from the direction of the accommodating case 5 by sliding said fast-forwarding lever 26.

Then a press spring 40 is stretched between the pin 28 fixed on said injecting lever 19 and the locating plate 23 in the rear portion of the lever 19 so that the sliding motion of said lever 19 may be steadied. Said spring's 40 power is less than that of the spring 18 which is fixed on the movable plate 7. The injecting lever 19 is slid forward with the downward swinging movement of said movable plate 7 and at the same time the fast-forwarding lever 26 is shifted forward so that every movement for approaching the mounting plate 36 to the direction of the accommodating case 5 may be continuously made.

Designated 41 is a lock plate which retains said tilting plate 7 in the condition of being detached from the accommodating case 5 and which also releases the movable plate 7, through the linking movement with the cassette 1 being placed in said case 5; one end of the lock plate 41 is pivotally fixed on said chassis 6 and also faces the inside of said case 5; on the other end of the lock plate is formed a V-shaped projecting portion 43 which presses and contacts the inner end of the cassette 1 and which is extended below the movable plate 7. Also above the middle of the lock plate 41 is projected a locking portion 44, which is contacted with the bottom plane of said movable plate 7 and which retains said plate 7 in the condition of being detached from the accommmodating case 5; on the movable plate 7 above the locking portion 44 is formed an opening 45, through which one part of said locking portion 44 is extended above the movable plate 7 when the plate 7 is raised and becomes a stop 46. Moreover, on the lock plate 41 is fixed a spring 47 which pulls said lock plate 41 toward the inserting direction of the cassette 1 and retains the position of the locking portion 44; the cassette 1 is accommodated within the accommodating case 5 and the lock plate 41 is pressed and swung against the spring 47; thereby the contact between said locking portion 44 and the plate adjacent said opening 45 is released and at the same time the movable plate 7 is moved downward by springs 18, 18, so that the winding reel shaft 8 and the capstan shaft 9 may be inserted and placed in the cassette 1. And then a starting switch 48, which turns the electric power of said driving motor 16 ON and OFF, is formed on the chassis 6 below the movable plate 7, and said starting switch 48 is turned ON at the time when the movable plate 7 moves down and the bottom plane of said plate 7 contacts said starting switch 48; thereby said motor 16 is rotated and the magnetic tape 2 is manipulated to drive.

Designated 49 is an electric circuit for playing back a magnetic tape which is electrically connected with said magnetic head 34, and said circuit 49 possesses a volume or tone adjustment mechanism 50.

Figure 1:
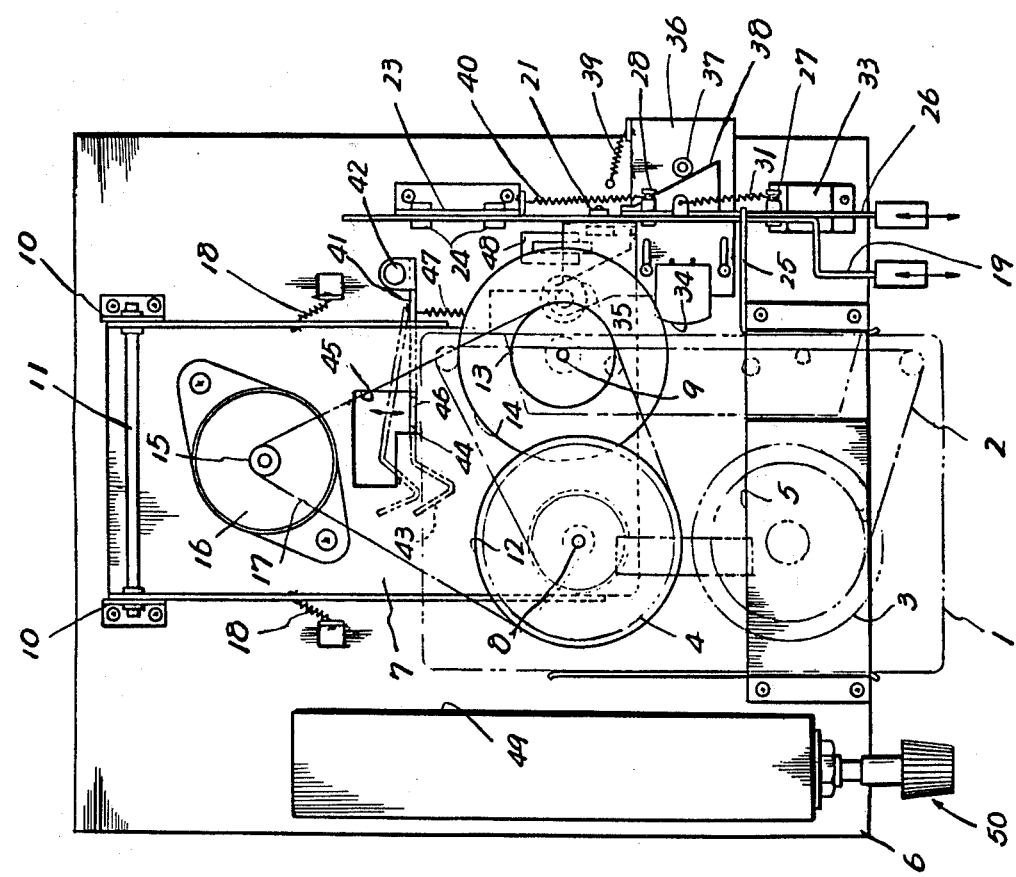
FIG. 1 is a general plan view of first embodiment of a tape recorder according to the present invention.
Figure 5:
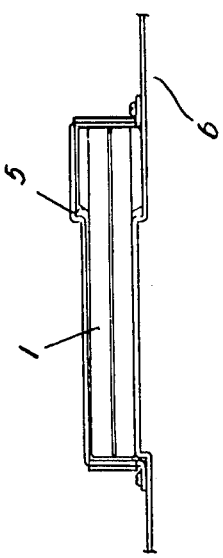
FIG. 5 is a sectional view taken along the line A—A in FIG. 3.
Figure 2:
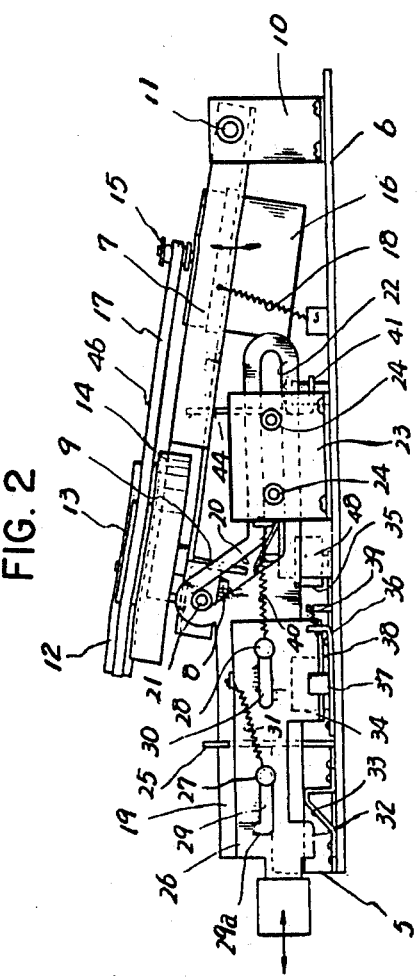
FIG. 2 is a side view of the same.

Thus in the case of play-back operation of the magnetic tape 2 within said cassette 1, as the cassette 1 is slid and inserted, as FIG. 3 and FIG. 5 indicate, in the accommodating case 5 which is under the condition as is indicated in FIG. 1 and FIG. 2, the inserting front side of the cassette 1 is contacted with the projecting portion 43 of the lock plate 41; said lock plate 41 is swingingly rotated against the spring 47, and the lock plate's receiving portion 44 is detached from the bottom of the movable plate 7 and is shifted toward the center of said plate's 7 opening hole 45; at the same time said movable plate 7 is moved down through the springs 18, 18 and on the supporting shaft 11 as a fulcrum, and the winding reel shaft 8 pivotally fixed on the movable plate 7 and the capstan shaft 9 are each inserted and placed in the formed holes of the cassette 1.

Also as the roller 21 attached to said movable plate's 7 side slides down, together with the downward movement of said plate 7, within the sloping slot 20 of the injecting lever 19, said lever 19 together with the fast-forwarding lever 26 is projected toward the chassis's 6 front, resisting the spring 40; simultaneously the sloping guide 38 of said lever 26 is shifted and the mounting plate 36 is slid to the direction of the accommodating case 5 by the power of the spring 39; the magnetic head 34 and the pinch roll 35 are thus accomodated within the cassette 1. Furthermore, at the same time, when the downward movement of the movable plate 7, as is mentioned above, comes to an end, the starting switch 48 which senses the end of the movement is turned ON, and the driving motor 16 is rotated, and through the belt 17 and each pulley 12, 13, 15, rotation power to rapidly forward a tape is given to the winding reel shaft 8 and also rotation power to play back a tape is given to the capstan shaft 9. Thus, as the magnetic head 34 is contacted to the magnetic tape 2 and also the pinch roll 35 is pressed to and contacted with the capstan shaft 9 through said tape 2, the magnetic tape 2 is transmitted at a speed of transmitting a play-back-tape, a speed due to the rotation power of the capstan shaft 9; said tape 2 is gradually wound round the winding real shaft 8 which rotates in a slipping condition (wherein the tape transmitting speed of the capstan shaft 9 is slower than the tape winding speed of the winding reel shaft 8); said tape 2 is thus played back. When taking out the cassette 1 at the end of playing back said tape 2, as the injecting lever 19 is pushed toward an inserting direction of the cassette 1, as shown in FIG. 3, the roller 21 is raised up along the sloping slot 20 of said lever 19; the movable plate 7 is swingingly rotated upward against the springs 18, 18, and at the same time the roll 37 of the mounting plate 36 is pressed by the sloping guide 38 of the fast-forwarding lever 26 which slides together with said lever 19; said plate 36 is detached from the accommodating case 5, resisting the spring 39, and the magnetic head 34 and the pinch roll 35 are detached from the cassette 1. Thus, as the movable plate 7 is raised and both the winding reel shaft 8 and the capstan shaft 9 are detached from the cassette 1, the lock plate 41 is rotated by the spring 47 toward the cassette 1 and the cassette 1 is pushed out of the accommodating case 5 through the projecting portion 43 of the lock plate 41; also the stopper 46 of the lock plate is contacted with the opening hole's 45 edge and the receiving portion 44 of the lock plate 41 is contacted with the bottom plane of the movable plate 7; thereby the whole situation at this stage becomes like what is indicated in FIG. 1 and FIG. 2 and said cassette 1 can be taken out and exchanged.

Figure 4:
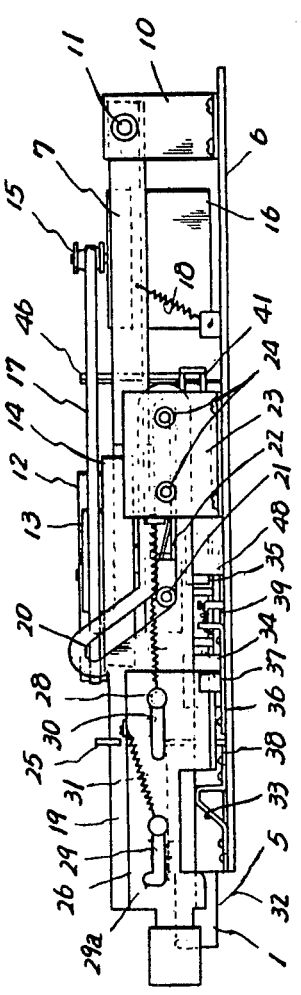
FIG. 4 is a side view of the FIG. 3.
Figure 6:
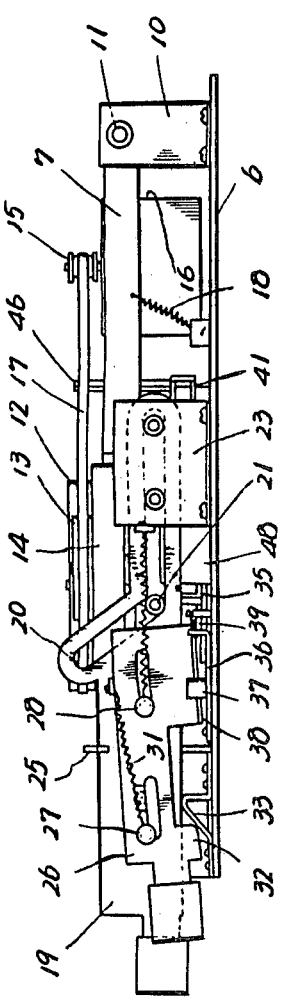
FIG. 6 is a view illustrating the operation as is shown in FIG. 4.

Also, in the case of rapidly forwarding the magnetic tape 2 within the cassette 1, as the fast forwarding lever 26 under the condition (as indicated in FIG. 3 and FIG. 4) is pushed toward the inserting direction of the cassette 1, resisting the spring 31, as is indicated in FIG. 6, the roll 37 of the mounting plate 36 is pressed by the sloping guide 38 of said lever 26; said plate 36 is detached from the accommodating case 5, resisting the spring 39; the magnetic head 34 and the pinch roll 35 are thus taken off the cassette 1. As the pinch roll 35 is detached from the capstan shaft 9, as is mentioned above, the magnetic tape 2 is transmitted at a speed of transmitting a rapid-winding-tape, a speed due to the rotation power of the winding reel shaft 8, and is wound round the winding reel 4 wherein is accomodated said reel shaft 8. Further, as the fast-forwarding lever 26 is pressed, as is mentioned above, the pin 27 fixed with the injecting lever 19 is placed in and contacted with the lock portion 29a of the slot 29 by somewhat slanting said lever 26; said lever 26 is stopped and retained in an operating condition and fast-forwarding operation of the magnetic tape 2 is continued. At this time, as said injecting lever 19 is pushed toward the inserting direction of the cassette 1, the tongue 32 of said fast-forwarding lever 26 is contacted with the raised sloping plane 33 and said lever 26 is swung upward.

And as the pin 27 is taken off the lock portion 29a of the slot 29, said lever 26 is moved backward by the spring 31 and the cassette 1 is taken out jest as the cassette 1 was, as mentioned above, ejected by the injecting lever 19.

As is mentioned above, the present invention is so simple and compact in construction that the placing and taking out of a cassette can be very easy, the operation of playback performance and fast-forwarding of a magnetic tape can be very simple, and the present invention can be fitted into a car or carried. As the winding reel shaft and the capstan shaft are linked through the same endless belt with their driving motor, each said shaft can be simply and lightly located, and also the movable plate and the mounting plate can be relatively operated with ease through the injecting lever and the fast-forwarding lever and also can be very compactly incorporated. Under the condition that the fast-forwarding lever is hooked and stopped in an operating condition, a magnetic tape can be rapidly forwarded and also the fast-forwarding operation and the play-back performance operation can be released by a simple act of the injecting lever. Furthermore, a cassette can be inserted in the accommodating case in a right condition without being misplaced, and especially the placement and removal of the cassette and the operation of the magnetic tape can be so precisely done that the present invention can have such a distinguished effect as makes it practical for a car.

FIGS. 7 to 14 show another embodiment of the tape recorder according to present invention in which designated 101 is a cassette containing a magnetic tape 102 definite in length and a pair of reels 103, 104 for winding said tape 102.

Designated 105 is an accommodating case, set on a tape recorder's chassis 106, which locates and retains the aforementioned cassette 101; the cross-sectional form of said cassette 101 and the opening form of said case 105 are made almost similar so that the cassette 101 may be slidably inserted in said case 105. A capstan shaft 109 is pivoted on a chassis 106 to move the magnetic tape at a constant speed. Said case 105 is pivoted on the chassis 106 through plates 110 and supporting shafts 111. A slip pulley 112 is formed on the common shaft of said winding reel shaft 108. On the same shaft of said capstan shaft 109 is formed a fly-wheel 114 which unites with it a linking pulley 113 and also at the center of the chassis 106 is formed a driving motor 116 which possesses an output pulley 115 on the same level as each of said pulleys 112 113. Moreover, corresponding to the rotation number of shaft 108 for winding a tape (i.e., fast-forwarding) and to the rotation number of capstan shaft 109 for transmitting a tape (i.e., playing back), radius $1_1$ and $1_2$ of each of said pulleys 112, 113 as well as a radius $1_3$ of the output pulley 115 of said motor 116 is formed; each of said pulleys 112, 113, 115 are cooperatively linked through the same endless belt 117, so that said motor's 116 output may be simultaneously supplied to the winding reel shaft 8 and the capstan shaft 109. The radius $1_1$, $1_2$ and $1_3$ of the pulleys 112, 113 and 115 are formed, for example, as $1_1=41_2=71_3$. Also press springs 118, 118 are stretched between free sides of the case 105 and said chassis 106 so that the winding reel shaft 108 and the capstan shaft 109 which are pivotally fixed on the chassis 106 may be pulled toward the accommodating case 105.

Designated 119 is an injecting lever which is linked and moved with said movable plate 107 in order to move the case 105 backward against the springs 118, 118. A sloping long hole, i.e., a taper element 120, which is slid backward and forward so as to raise the forward portion higher, is formed in the middle of said lever 119; a roller 121, which is inserted in and contacted with the inside of said long hole 120, is pivotally fixed on the free side of the case 105. Furthermore, a long slot 122 is formed by extending the bottom of said sloping 120 toward the rear part of the injecting lever 119; pins 124, 124 inserted with the heads projected in the side of a locating plate 123, which is fixed with the chassis 106,, are slidably inserted in said slot 122; the front part of said lever 119 is slidably inserted in a guide plate 125 which is perpendicularly installed on the chassis 106; thereby rolling motion of the movable plate 107 and sliding motion of the injecting lever 119 can be made to cooperate.

Designated 126 is a fast-forwarding lever slidably attached to said injecting lever's 119 side. Pins 127, 128 installed with their heads projected on said lever 119 are slidably inserted in a slot 129 which is formed in the longitudinal direction of the lever 126. A lock portion 129a, i.e., one stopping element which is contacted and hooked with the pin 127, i.e., the other stopping element, is formed by extending upward the front portion slot 126, and at the same time said lever 126 is moved and urged forward by stretching a press spring 131 between the pin 127 and rear portion of the fast-forwarding lever 126. Also, a tongue 132, i.e., one releasing element, is projectably formed on the lower portion of said lever 126; on the chassis's 106 plane below the lever 126 is formed a raised sloping plane 33, forming the other releasing element, which rotates the lever 126 upward with a swinging movement through the contact with said tongue 132 and on the pin 128 as a fulcrum; the fast-forwarding lever 126 is kept in an operating condition through the linkage between the pin 127 and the lock portion 129a, and said linkage is released through the contact between the tongue 132, i.e., a releasing element and the raised sloping plane 133, and the lever 126 is moved backward by means of the spring 131. Moreover, on the chassis 106 and in the condition of facing the accommodating case 105 is slidably formed a mounting 136 which carries a magnetic head 134 to be contacted with a magnetic tape 102 of the cassette 101 placed in the accommodating case 105 and also carries a pinch roll 135 to be pressed and contacted through the magnetic tape 102 with the capstan shaft 109 inserted in the cassette 101; on the plate 136 is pivotally fixed a guide roller 137 and also on the side of said fast-forwarding lever 126 is formed a sloping guide 138 with the front portion of the lever 126 is formed a sloping guide 138 with the front portion of the lever 126 projected; a spring 139 is fixed with the plate 136 so that said roller 137 may be pressed and contacted with this guide 138; thereby said performance plate 136 is to approach to, and detach from, the direction of the accommodating case 105 by sliding said fast-forwarding lever 126.

A press spring 140 is stretched between the pin 128 fixed on said injecting lever 119 and the locating plate 123 in the rear portion of the lever 119 so that the sliding motion of said lever 119 may be steadied. Said spring's 140 power is formed to be smaller than that of the spring 118 which is fixed on the movable plate 107; the injecting lever 119 is slid forward with the downward swinging movement of said case 105 and at the same time the fast-forwarding lever 126 is shifted forward so that every movement for approaching the performance plate 136 to the direction of the accommodating case 105 may be continuously made.

Designated 141 is a lock plate which raises and retains said case 105 in the condition of being detached from the chassis 106 and which also releases the movement of raising up the case 105, through the linking movement with the cassette 101 placed in said case 105; one end of the lock plate 141 is pivotally fixed on said chassis 106 and also is faced to the inside of said case 105; on the other end of the lock plate is formed a V-shaped projecting portion 143 which presses and contacts the inner end of the cassette 101.. Also above the middle of the lock plate 141 is an upwardly projecting portion 144, which is contacted with the bottom plane of said case 105 and which raises and retains said plate 107 in the condition of being raised above the chassis 106; on the base of the case 105 above the receiving portion 144 is formed an opening 145, i.e., a contacting portion 144 is formed an opening 145, i.e., a contacting portion which is contacted with said projection 144. Moreover, on the lock plate 141 is fixed a spring 147 which pulls said lock plate 141 toward the inserting direction of the cassette 101 and retains the raising movement made by the projection 144; the cassette 101 is accomodated within the accommodating case 105 and the lock plate 141 is pressed and swung against the spring 147; thereby said projection 144 moves into said opening 145 and at the same time the case 105 is moved downward by springs 118, 118, so that the winding reel shaft 108 and the capstan shaft 109 may be inserted and placed in the cassette 101. A starting switch 148, which turns the electric power of said driving motor 116 ON and OFF, is formed on the chassis 106 below the case 105, and said starting switch 148 is turned ON at the time when the case 105 moves down and the bottom plane of case 105 contacts said starting switch 148; thereby said motor is rotated and the magnetic tape 108 is manipulated to drive.

Designated 149 is an electric circuit for playing back a magnetic tape which is electrically connected with said magnetic head 134, and said circuit 149 possesses a volume or tone adjustment mechanism 150.

Figure 8:
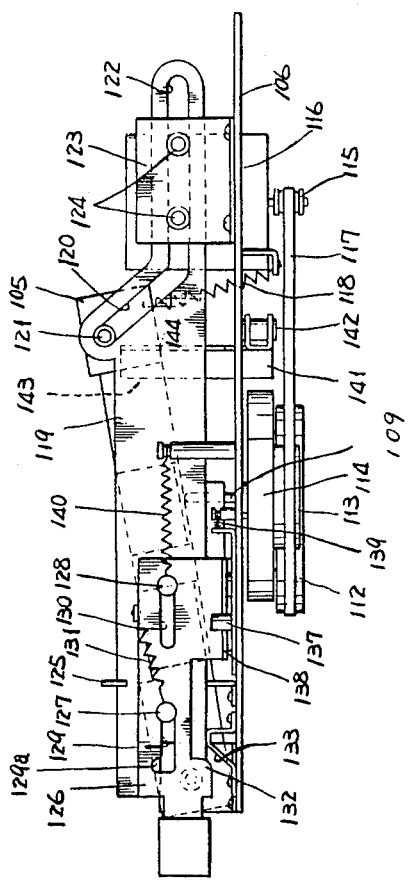
FIG. 8 is a side view of the second embodiment.
Figure 7:
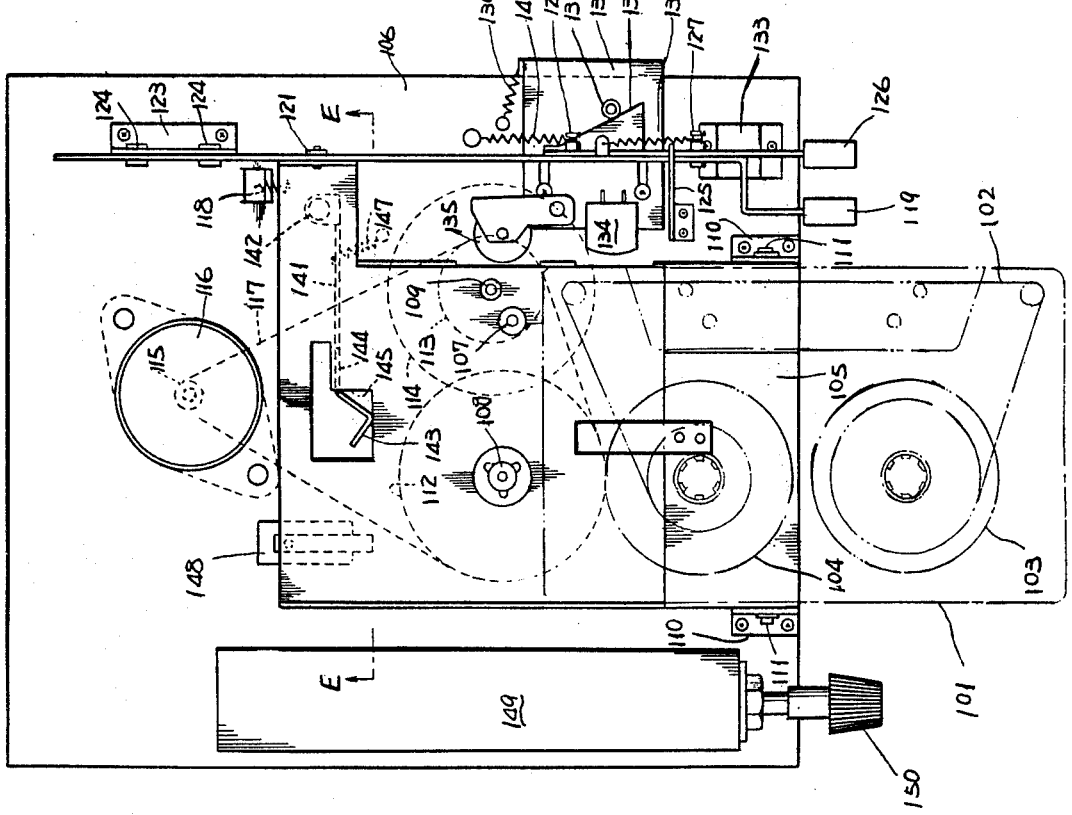
FIG. 7 is a general plan view of second embodiment of a tape recorder according to the present invention.
Figure 10:
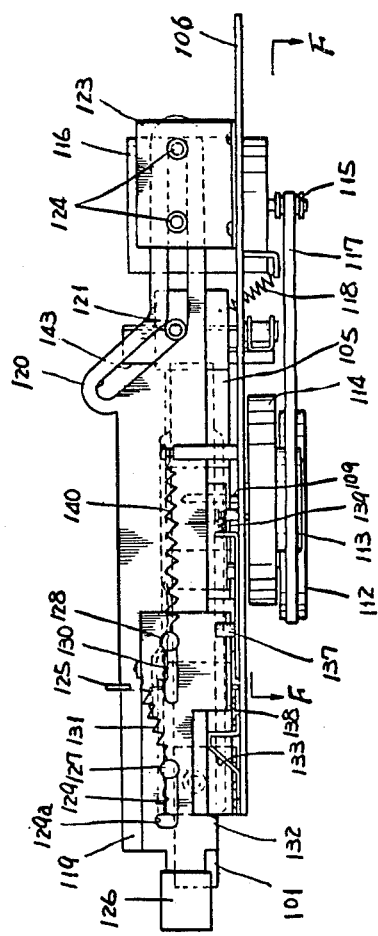
FIG. 10 is a side view of FIG. 9.
Figure 9:
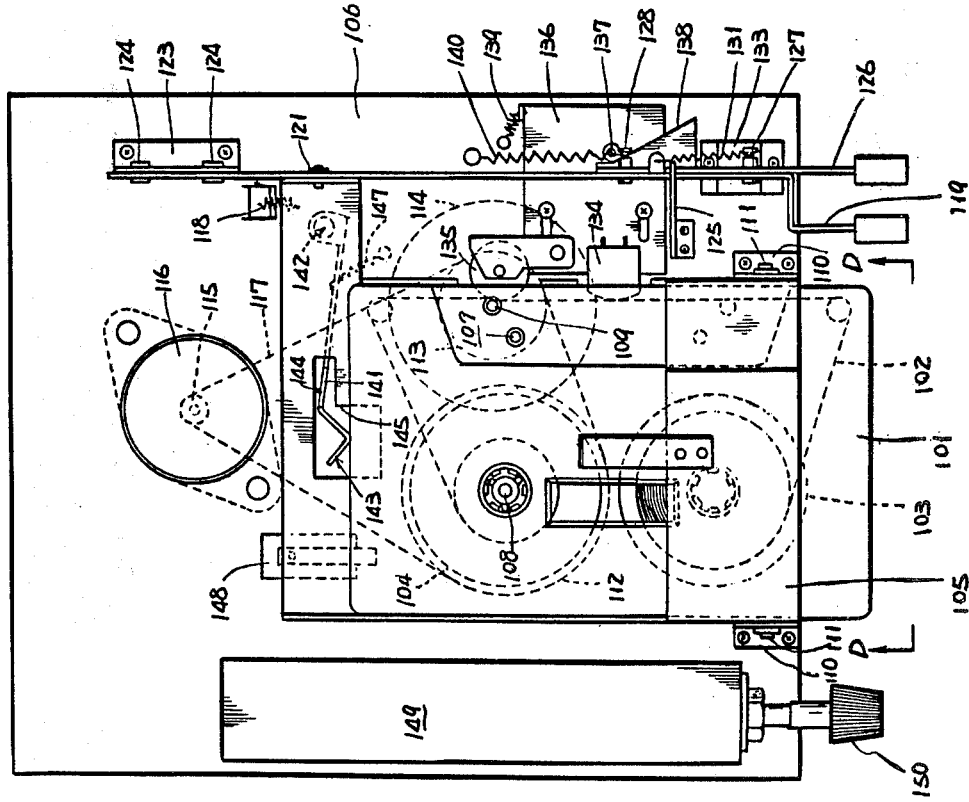
FIG. 9 is a plan view illustrating the condition of a cassette's placement in the tape recorder in the second embodiment.
Figure 13:
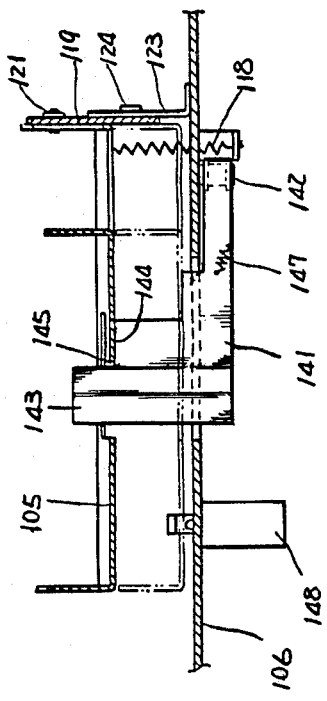
FIG. 13 is a view taken along the line E—E in FIG. 7
Figure 14:
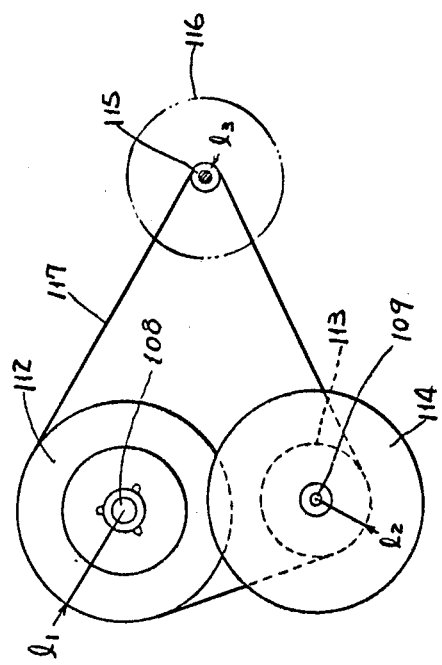
FIG. 14 is a view taken along the line F—F in FIG. 10.
Figure 11:
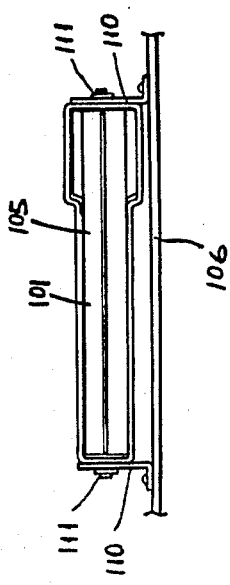
FIG. 11 is a sectional view taken along the line D—D in FIG. 9.

Thus, in the case of play-back operation of the magnetic tape 102 within said cassette 101, as the cassette 101 is slid and inserted, as FIGS. 9 to 11 indicated in FIG. 7 and FIG. 8, the inserting front side of the cassette 101 is contacted with the projecting portion 143 of the lock plate 141; said lock plate 141 is swingingly rotated against the spring 147, and the lock plate's upwardly projecting portion 144 is detached from the bottom of the case 105 and is shifted toward the center of said opening 145 at the same time said case 105 is moved down through the springs 118, 118 on the supporting shaft 111 as a fulcrum, and the winding reel shaft 108 pivotally fixed on the movable case 105 and the capstan shaft 109 are each inserted and placed in the formed holes of the cassette 101. Also as the rotation roll 121 attached to said movable case's 105 side slides down, together with the downward movement of case 105, within the sloping slot 120 of the injecting lever 119, said lever 119 together with the fast-forwarding lever 126 is projected toward the chassis's 106 front, resisting the spring 140, simultaneously the sloping guide 138 of said lever 126 is shifted and the mounting plate 126 is slid to the direction of the accommodating case 105 by the power of the spring 139; the magnetic head 134 and the pinch roll 135 are thus accomodated within the cassette 101. Furthermore, at the same time when the downward movement of the case 105, as is mentioned above, comes to an end, the starting switch 148 which senses the end of the movement is turned ON, and the driving motor 116 is rotated, and through the belt 117 and pulleys 112, 113, 115, rotation power to rapidly forward a tape is given to the winding reel shaft 108 and rotation power to play back a tape is given to the capstan shaft 109. Thus, as the magnetic head 134 is contacted to the magnetic tape 102 and also the pinch roll 135 is pressed to and contacted with the capstan shaft 109 through said tape 102, the magnetic tape 102 is transmitted at a speed of transmitting a play-back-tape, a speed due to the rotation power of the capstan shaft 109; said tape 102 is gradually wound round the winding reel shaft 108 which rotates in a slipping condition (wherein the tape transmitting speed of the capstan shaft 109 is slower than the tape winding speed of the winding reel shaft 108); said tape 102 is thus played back. Then in the case of taking out the cassette 101 at the end of the playing back of said tape 102, as the injecting lever 119 under the condition as indicated in FIG. 3 and FIG. 4 is pushed toward an inserting direction of the cassette 101, the roller 121 is raised up along the sloping slot 120 of said lever 119; the case 105 is swingingly rotated upward against the springs 118, 118 and at the same time the roller 137 of the mounting plate 136 is pressed by the sloping guide 138 of the fast-forwarding lever 126 which slides together with said lever 119; said plate 136 is detached from the accommodating case 105, resisting the spring 139 and the magnetic head 134 and the pinch roll 135 are detached from the cassette 101. Thus, as the case 105 is raised and both the winding reel shaft 108 and the capstan shaft 109 are detached from the cassette 101, the lock plate 141 is rotated by the spring 147 toward the cassette 101 and the cassette 101 is pushed out of the accommodating case 105 through the projecting portion 143 of the lock plate 141; also, the stopper 146 of the lock plate 141 is contacted with the opening hole's 145 edge and the upwardly projecting portion 144 of the lock plate 141 is contacted with the bottom plane of the case 105; thereby the situation at this stage returns to that indicated in FIG. 7 and FIG. 8 and said cassette 101 can be taken out and exchanged.

Figure 12:
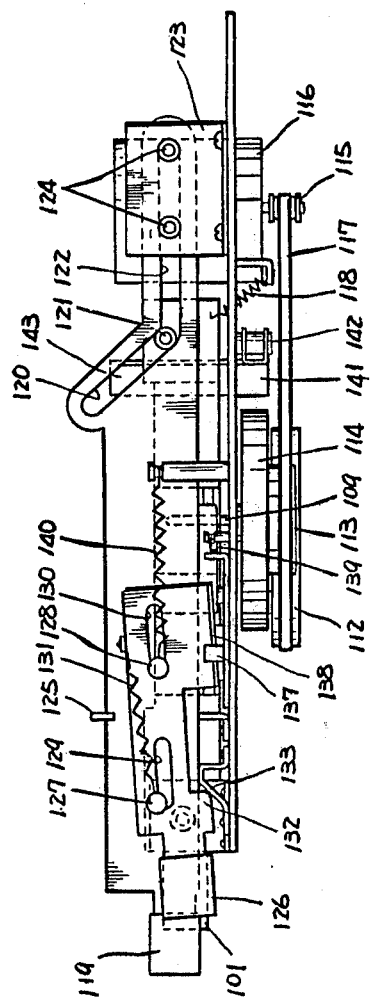
FIG. 12 is a view illustrating the operation as is shown in FIG. 10.

Also, in the case of rapidly forwarding the magnetic tape 102 within the cassette 101, as the fast-forwarding lever 126, under the condition as indicated in FIG. 9 and FIG. 10 is pushed toward the inserting direction of the cassette 101, resisting the spring 131,, as is indicated in FIG. 12, the roller 137 of the mounting plate 136 is pressed by the sloping guide 138 of said lever 126; said plate 136 is detached from the accomodating case 105, resisting the spring 139; the magnetic head 134 and the pinch roll 135 are thus taken off the cassette 101. As the pinch roll 135 is detached from the capstan shaft 109, as is mentioned above, the magnetic tape 102 is transmitted at a speed of transmitting a rapid-winding-tape, a speed due to the rotation power of the winding reel shaft 108 and is wound round the winding reel 104 wherein is accommodated said reel shaft 108. Further, as the fast-forwarding lever 126 is pressed, as is mentioned above, the pin 127 fixed with the injecting lever 119 is placed in and contacted with the lock portion 129a of the slot 129 by somewhat slanting said lever 126; said lever 126 is stopped and retained in an operating condition and the fast-forwarding operation of the magnetic tape 102 is continued. At this time, as said injecting lever 119 is pushed toward the inserting direction of the cassette 101; the tongue 132 of said fast-forwarding lever 126 is contacted with the raised sloping plane 133 and said lever 126 is swung upward. As the pin 127 is taken off the lock portion 129a of the slot 129, said lever 126 is moved backward by the spring 131 and the cassette 101 is taken out just as the cassette 101 was, as mentioned above, ejected by the injecting lever 119.

What is claimed is:

1. A tape recorder comprising a case for accommodating a cassette wherein are located a magnetic tape and reels for winding said magnetic tape, a winding reel shaft for supporting and driving a winding reel, a capstan shaft for forwarding the magnetic tape at constant speed, said shafts being rotatably mounted on a plate, an injecting lever for engaging and releasing the winding reel shaft and the capstan shaft to and from a cassette positioned in said case, locking means for keeping said winding reel shaft and the capstan shaft out of engagement with the cassette, means linked with the cassette to disengage the locking means to engage the winding reel shaft and the capstan shaft with said cassette a tapered element being formed on said injecting lever; a slipping element which is contiguous to said tapered element being formed on said plate; said plate being movable to the accomodating case when the injecting lever is moved forward; also the movable plate can be detached from the accomodating case by moving the injecting lever backward.

2. A tape recorder comprising a case for accommodating a cassette wherein are located a magnetic tape and reels for winding said magnetic tape, a winding reel shaft for supporting and driving a winding reel, a capstan shaft for forwarding the magnetic tape at constant speed, said shafts being rotatably mounted on a plate, an injecting lever for engaging and releasing the winding reel shaft and the capstan shaft to and from a cassette positioned in said case, locking means for keeping said winding reel shaft and the capstan shaft out of engagement with the cassette, means linked with the cassette to disengage the locking means to engage the winding reel shaft and the capstan shaft with said cassette, a slip pulley mounted on said winding reel shaft and a fly-wheel mounted on said capstan shaft and having a linking pulley; the diameters of the slip pulley and the linking pulley corresponding to the established rotation number of said reel shaft and said capstan shaft; an output pulley of a motor which drives said shafts being linked to said pulleys through a single endless belt, a fast-forwarding lever being slidably formed on said injecting lever and is also formed to be linked with a mounting plate to which is attached a magnetic head and a pinch roll.

3. A tape recorder as claimed in claim 1, wherein a stopping element for keeping said fast-forwarding lever in an operating condition and a releasing element for releasing the linkage of said stopping element at the start of said injecting lever are formed; thereby said fast-forwarding lever can be kept stopped at its start and the fast-forwarding lever can be moved backward by said injecting lever's ejecting a cassette.

4. A tape recorder comprising a case for accommodating a cassette wherein are located a magnetic tape and reels for winding said magnetic tape, a winding reel shaft for supporting and driving a winding reel, a capstan shaft for forwarding the magnetic tape at constant speed, said shaft being rotatably mounted on a plate, an injecting lever for engaging and releasing the winding reel shaft and the capstan shaft to and from a cassette positioned in said case, locking means for keeping said winding reel shaft and the capstan shaft out of engagement with the cassette, means linked with the cassette to disengage the locking means to engage the winding reel shaft and the capstan shaft with said cassette, a movable plate being pivotally connected at the end of the accommodating case above said chassis so as to move up and down flexibly; thereby said movable plate can be raised upward and retained there and the movable plate can be moved downward by accommodating the cassette thus the winding reel shaft and the capstan shaft can be accommodated from the upper part of said cassette.

5. A tape recorder as claimed in claim 1, wherein a stopping element for keeping said fast-forwarding lever in an operating condition and a releasing element for releasing the linkage of said stopping element at the start of said injecting lever are formed; thereby said fast-forwarding lever can be kept stopped at its start and the fast-forwarding lever can be moved backward by said injecting lever's ejecting a cassette.

6. A tape recorder comprising a case for accommodating a cassette wherein are located a magnetic tape and reels for winding said magnetic tape, a winding reel shaft for supporting and driving a winding reel, a capstan shaft for forwarding the magnetic tape at constant speed, said shafts being rotatably mounted on a plate, an injecting lever for engaging and releasing the winding reel shaft and the capstan shaft to and from a cassette positioned in said case, locking means for keeping said winding reel shaft and the capstan shaft out of engagement with the cassette, means linked with the cassette to disengage the locking means to engage the winding reel shaft and the capstan shaft with said cassette, a tapered element being formed on said injecting lever; a slipping element which is contiguous to said tapered element being formed on said case whereby said case can approach to the chassis and at the same time the injecting lever can be moved forward; also the case can be detached from the chassis by moving the injecting lever backward.

7. A tape recorder comprising a case for accommodating a cassette wherein are located a magnetic tape and reels for winding said magnetic tape, a winding reel shaft for supporting and driving a winding reel, a capstan shaft for forwarding the magnetic tape at constant speed, said shafts being rotatably mounted on a plate, an injecting lever for engaging and releasing the winding reel shaft and the capstan shaft to and from a cassette positioned in said case, locking means for keeping said winding reel shaft and the capstan shaft out of engagement with the cassette, means linked with the cassette to disengage the locking means to engage the winding reel shaft and the capstan shaft with said cassette, a slip pulley mounted on said winding reel shaft and a fly-wheel mounted on said capstan shaft and having a linking pulley; the diameters of the slip pulley and the linking pulley corresponding to the established rotation number of said reel shaft and said capstan shaft; an output pulley of a motor which drives said shafts being linked to said pulleys through a single endless belt, a fast-forwarding lever being slidably formed on said injecting lever and is also linked with a mounting plate to which is attached a magnetic head and a pinch roll.

8. A tape recorder of the type adapted to operate with a cassette containing a magnetic tape carried on two winding reels, said cassette having appropriate openings for the insertion of a winding reel shaft, a capstan pinch roll and magnetic head into operative engagement with said tape in said cassette, comprising a chassis, a case for removably receiving a tape cassette inserted therein by movement in a direction lying at right angles to the plane of the axes of the winding reel, a winding reel shaft, a capstan shaft, a magnetic head, a pinch roll, first mounting means for supporting said case, said winding reel shaft and said capstan shaft on said chassis for relative movement between said case and said shafts for engagement and disengagement of the winding reel shaft and capstan shaft with a winding reel and capstan opening respectively of a cassette inserted in said case, second mounting means for supporting said magnetic head in said pinch roll on said chassis for movement toward and away from the tape in said inserted cassette, and actuating means connecting said first and second mounting means for conjointly moving said mounting means in response to insertion of a cassette into said case to engage the winding reel with the winding reel shaft, to move the pinch roll to engage the tape with said capstan and to move the head into contact with the tape, said first mounting means comprising two elements, said case being attached to one of the elements, the winding reel shaft and capstan shaft being rotatably attached to the other element, said two elements being pivotally joined for tilting movement with respect to each other about an axis lying generally in the plane of a cassette inserted into the case, one of said elements being movable between a first position adjacent to the other element with said winding reel shaft and capstan shaft inserted respectively into the winding reel and capstan opening of an inserted cassette and a second position spaced from the other element with said shafts removed respectively from the winding reel and capstan opening to allow insertion and removal of a cassette into and from said case.

9. A tape recorder as claimed in claim 8, wherein an injection lever means including camming means engageable with said first and second mounting means is mounted on said chassis for movement between a first and second position to move said magnetic head and pinch roll away from the tape and to disengage said winding reel shaft and capstan shaft from engagement with the winding reel and capstan opening respectively.

10. A tape recorder as claimed in claim 9, wherein a fast-forward lever means is engageable with said second mounting means and is mounted on said chassis for movement between a first and second position to move said magnetic head and pinch roll away from the tape to allow the speed of the winding reel to be controlled solely by the speed of the winding reel shaft.

11. A tape recorder as claimed in claim 8, wherein said first mounting means includes biassing means to urge said one element toward the other element to said first position, an injection lever means movably connected with said two elements for movement of said elements from said first position to said second position, and locking means releasably engageable engageable with said two elements and responsive to the movement of said one element to said second position to hold said one element in said second position, said locking means being released by contact with a cassette inserted into the case to allow the one element to return to said first position in response to urging of said biassing means.

12. A tape recorder as claimed in claim 11, wherein said tape recorder includes electrical circuit means including a motor for driving said winding reel shaft, and switch means connected with at least one of said two elements to energize said motor when said one element is in said first position.

13. A tape recorder as claimed in claim 8, wherein said first mounting means includes injection lever means provided with camming means engageable with one of said two elements, said injection lever means being mounted on said chassis for movement between first and second positions to move said one element from said first position to said second position.

14. A tape recorder as claimed in claim 13, wherein said one of the two elements to which the case is attached is fixed with respect to the chassis.

15. A tape recorder as claimed in claim 13, wherein said one of two elements to which the case is attached is movable with respect to the chassis.

16. A tape recorder as claimed in claim 13, wherein said magnetic head and pinch roll are mounted on a plate, said plate being slidably mounted on the chassis for movement toward and away from a cassette inserted in said case, and fast-forward lever means is movably mounted on said injecting lever means, said last-mentioned lever means being provided with camming means engageable with said plate when moved in one direction to move the plate away from said cassette.

17. A tape recorder as claimed in claim 16, wherein said one of the two elements to which the case is attached is fixed with respect to the chassis.

18. A tape recorder as claimed in claim 16, wherein said one of the two elements to which the case is attached is movable with respect to the chassis.

* * * * *

UNITED STATES PATENT OFFICE
CERTIFICATE OF CORRECTION

Patent No. 4,021,005          Dated May 3, 1977

Inventor(s) Shigeji TAKEMOTO et al.

It is certified that error appears in the above-identified patent and that said Letters Patent are hereby corrected as shown below:

In the heading, bracket 30 bracket, "Foreign Application Priority Data," the correct number of the Japanese Application dated July 13, 1974 is --49-80555--.

Signed and Sealed this fifth Day of July 1977

[SEAL]

Attest:

RUTH C. MASON
*Attesting Officer*

C. MARSHALL DANN
*Commissioner of Patents and Trademarks*